US012028380B2

(12) United States Patent
Gamra

(10) Patent No.: US 12,028,380 B2
(45) Date of Patent: Jul. 2, 2024

(54) SYSTEMS AND METHODS FOR NETWORK RISK MANAGEMENT, CYBER RISK MANAGEMENT, SECURITY RATINGS, AND EVALUATION SYSTEMS AND METHODS OF THE SAME

(71) Applicant: FortifyData Inc., Kennesaw, GA (US)

(72) Inventor: Victor Gamra, Kennesaw, GA (US)

(73) Assignee: Fortify Data Inc., Kennesaw, GA (US)

( * ) Notice: Subject to any disclaimer, the term of this patent is extended or adjusted under 35 U.S.C. 154(b) by 384 days.

(21) Appl. No.: 17/347,777

(22) Filed: Jun. 15, 2021

(65) Prior Publication Data
US 2022/0400135 A1    Dec. 15, 2022

(51) Int. Cl.
*H04L 9/00* (2022.01)
*H04L 9/40* (2022.01)

(52) U.S. Cl.
CPC .......... *H04L 63/20* (2013.01); *H04L 63/1425* (2013.01); *H04L 63/1433* (2013.01)

(58) Field of Classification Search
CPC .. H04L 63/20; H04L 63/1425; H04L 63/1433
USPC .......................................................... 726/23
See application file for complete search history.

(56) References Cited

U.S. PATENT DOCUMENTS

| | | | | |
|---|---|---|---|---|
| 8,997,234 | B2* | 3/2015 | McClure | H04L 43/091 |
| | | | | 726/25 |
| 10,277,619 | B1 | 4/2019 | Clark, II et al. | |
| 2008/0271143 | A1 | 10/2008 | Stephens et al. | |
| 2015/0215332 | A1 | 7/2015 | Curcic et al. | |
| 2016/0197953 | A1 | 7/2016 | King-Wilson | |
| 2020/0220895 | A1 | 7/2020 | Jones et al. | |
| 2020/0274894 | A1* | 8/2020 | Argoeti | H04L 63/1433 |
| 2021/0051160 | A9* | 2/2021 | Abu-Nimeh | H04L 63/1433 |
| 2023/0021414 | A1* | 1/2023 | Kumar | G06F 21/577 |
| 2023/0171292 | A1* | 6/2023 | Crabtree | H04L 63/20 |
| | | | | 726/22 |

OTHER PUBLICATIONS

"Analysis of Multiplicative Combination Rules When the Causal Variables are Measured With Error"; Psychological Bulletin vol. 93 #3 pp. 549-562 (Year: 1983).*
Busemeyer et al. Analysis of multiplicative combination rules when the causal variables are measured with error, Psychological Bulletin, 93(3), Dec. 1983, p. 549. [online], [retrieved on Aug. 19, 2022]. Retrieved from the Internet <URL:https://jbusemey.pages.iu.edu/busemeyerPsychBul11983.pdf>, entire document, especially p. 554.

* cited by examiner

*Primary Examiner* — Christopher J Brown
(74) *Attorney, Agent, or Firm* — Troutman Pepper Hamilton Sanders LLP; Christopher C. Close, Jr.

(57) ABSTRACT

A method of building a risk management model, the method including: sampling a plurality of organization networks; assessing identified security features; ranking the identified security features based on security risk; transforming ranked features into categorized factors; building logistic model to blend the categorized factors into a likelihood of breach; and transforming the logistics model from a multiplicative model to an additive model by scaling the logistics model.

11 Claims, 5 Drawing Sheets

SYSTEMS AND METHODS FOR NETWORK RISK MANAGEMENT, CYBER RISK MANAGEMENT, SECURITY RATINGS, AND EVALUATION SYSTEMS AND METHODS OF THE SAME

FIELD

The present disclosure generally relates to network risk management and, more particularly, to the assessment and management of cyber-security risks across network.

BACKGROUND

Risk management involves the measuring and/or assessing of risk and the development and implementation of strategies to manage and reduce that risk. In a computer network, risk management involves preventing and addressing malicious attacks and vulnerabilities. Known technologies for risk management of computer systems are described as follows.

The related art approaches rely primarily on passive analysis to determine a networks' risk. However, passive analysis may only provide information on whether a system has been compromised, and not the vulnerability of a system. That is, some secure systems may have been compromised but, through luck or lack of effort, an insecure system may not be compromised. Furthermore, the related art approaches are unable to detect vulnerabilities in substantial real time, but rather rely on historical data which may be inaccurate or stale. Additionally, the related art approaches provide a fixed analysis. However, these related art approaches do not provide the flexibility to provide custom or customizable assessment based on specific risk profiles of a system.

Accordingly, there is needed an advanced approach that incorporates active scanning and flexible definitions into network risk management and assessment. In some embodiments, these features provide improved accuracy, thoroughness and/or timeliness of assessment and management. Aspects of the present disclosure address these and other issues.

SUMMARY

According to some embodiments, there is provided a method of building a risk management model, the method including: sampling a plurality of organization networks; assessing identified security features; ranking the identified security features based on security risk; transforming ranked features into categorized factors; building logistic model to blend the categorized factors into a likelihood of breach; and transforming the logistics model from a multiplicative model to an additive model by scaling the logistics model.

According to some embodiments, there is provided a method of performing risk management of networked systems, the method including: performing at least one of external network assessments and external web application assessments; determining a patching cadence on the networked systems; analyzing historic data breaches of the networked systems; performing an environmental risk assessment on networked systems; assessing risks associated with vendors of networked systems; and performing compliance and control gap assessment.

BRIEF DESCRIPTION OF THE DRAWINGS

The accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Certain aspects of the present disclosure relate to risk management of networked systems. In some cases, a system may access and detect various data sources to provide risk management assessment and analysis. The risk management may be configurable and adaptable to real-time changes in the networks system and risk profiles of the systems. In some cases, counterfactual risk assessments may be generated for modifications of the system and/or the joining of additional systems and vendors. The system may provide a graphical user interface (GUI) that provides improved user functionality, enabling the customization. The GUI may enable vulnerability assessment and present a risk score along with risk factor identification and remediation. Thus, the GUI may provide technical features not found in the related art. In some cases, the GUI may provide validation assistance for risk-assessment analysis and procedure verification.

Aspects of the present disclosure will now be discussed with reference to the several figures. One of ordinary skill will recognize that the figures are merely illustrative, and the scope of the present disclosure is not limited thereby.

Figure 1:
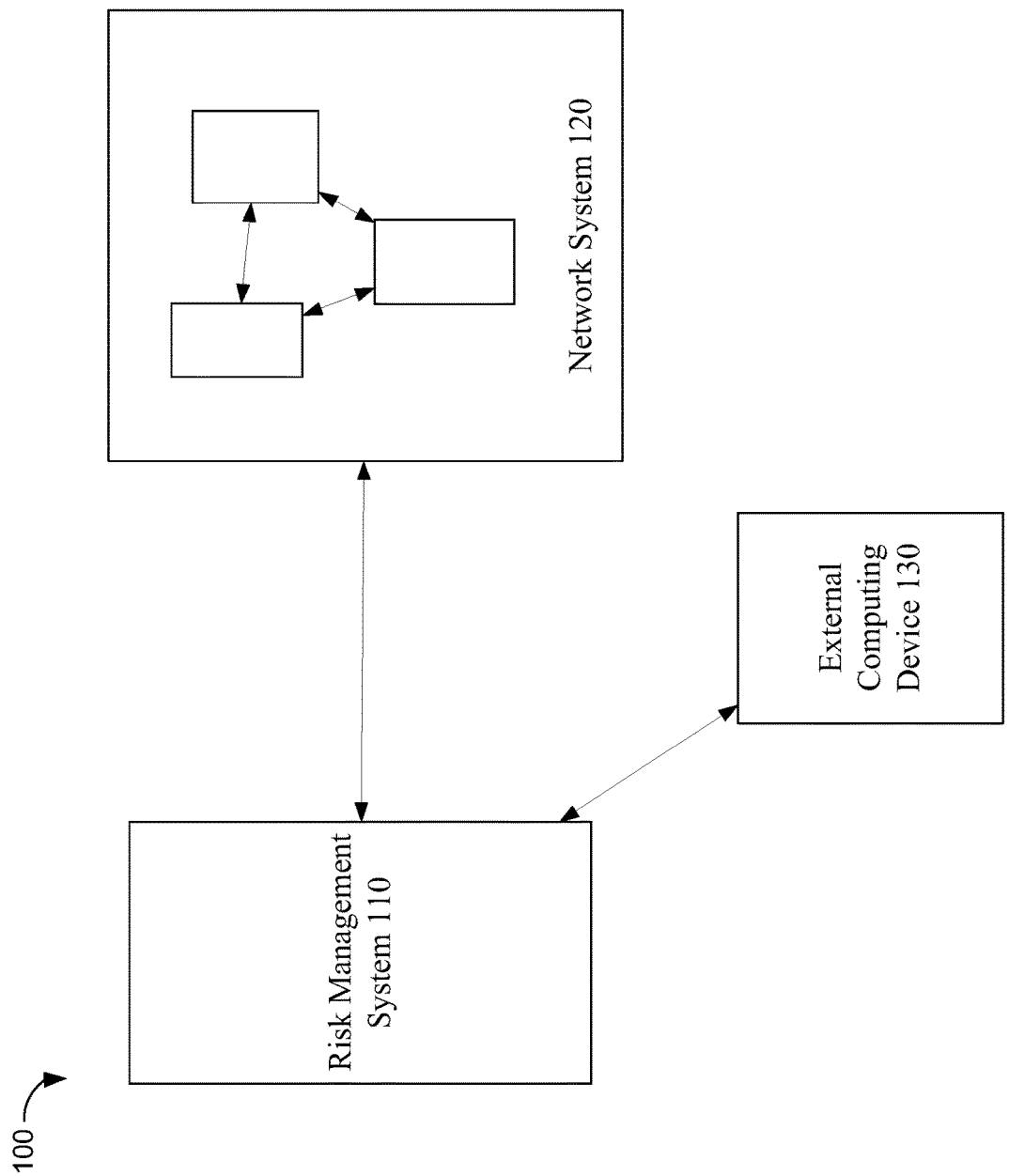
FIG. 1 illustrates a system environment according to aspects of the present disclosure.

FIG. 1 illustrates a system environment 100 in which aspects of the present disclosure may be implemented. Referring to FIG. 1, a risk management system 110 connects with a network system 120 to perform risk management. The network system 120 may include a plurality of networked or associated systems including servers, modems, switches, and gateways. As discussed in further detail below, risk management system 110 may connect directly with network system 120 to perform active risk assessment. Network system 120 may also connect to external computing device 130 for assistance with the risk management. For example, external computing device 130 may be a dark web server, and risk management system 110 may determine data of the network system 120 available thereon. In some case, external computing device 130 may be an update server having patches available for the network system 120, and risk management system 110 may determine available patches and publication dates to determine network system 120's update analysis.

Figure 2:
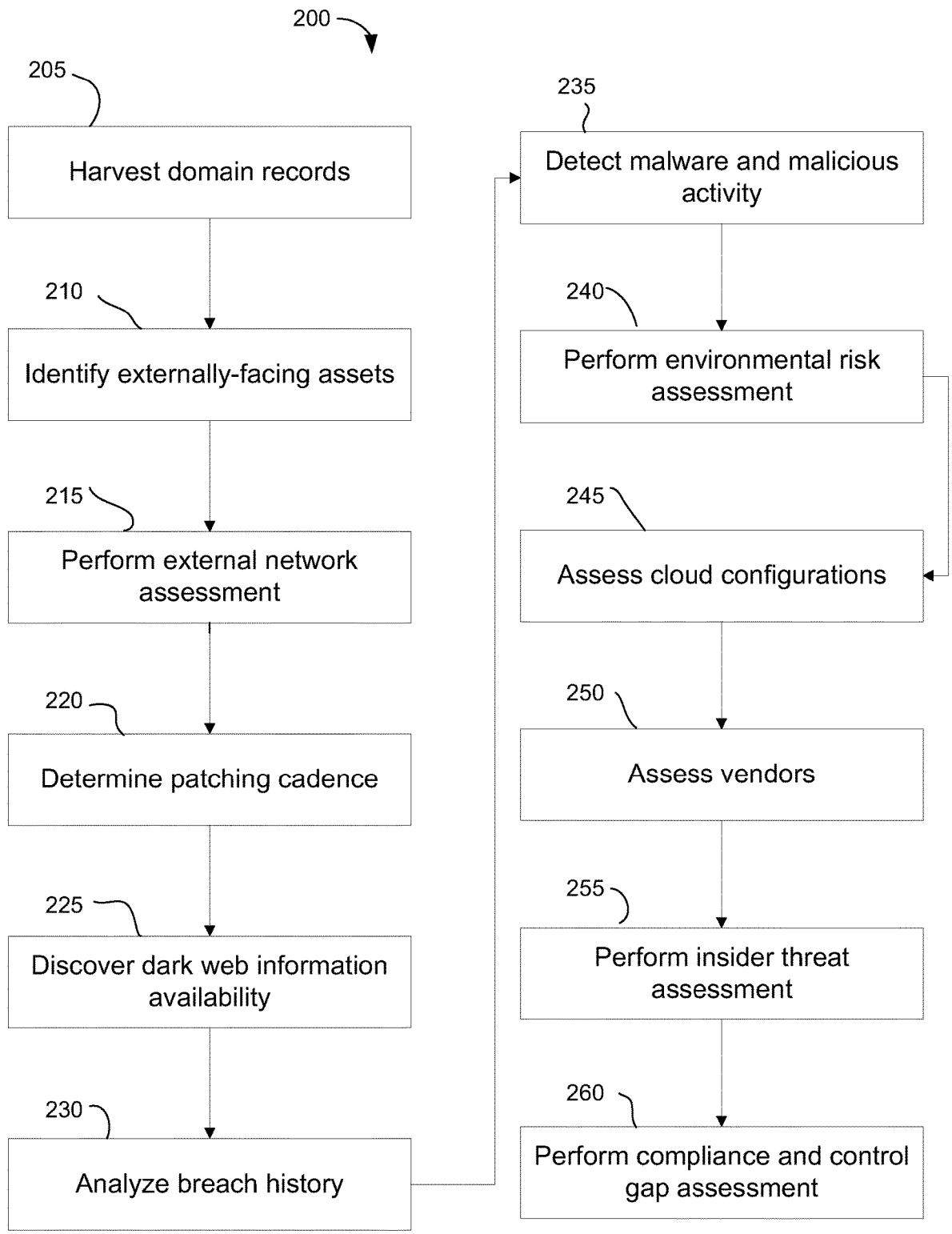
FIG. 2 is a flowchart of level one risk assessment according to aspects of the present disclosure.

In some cases, risk management system 110 may provide multi-tiered risk management. For example, first level risk management may include data gathering and assessment. FIG. 2 illustrates an example flowchart 200 of performing first level risk assessment. Risk management system 110 may harvest 205 domain records based on one or more root domains of the network systems. Risk management system 110 may identify 210 all externally facing assets (e.g., DNS records) and gather geolocation and open port information. Next, risk management system 110 may perform various assessments.

At 215, risk management system 110 may perform external network assessments and/or external web application assessments. The external network assessments may check for vulnerabilities at the network layer, for example, assessing hardware, ports, and/or encryption. The application assessment may check on vulnerabilities at the application layer of an OSI model. This is focused more on the application/software side, for example, by reviewing OWASP findings/vulnerabilities. For example, risk management system 110 may determine which, if any, common vulnerabilities and exposures (CVE) apply to network system 120 and/or determine a Common Vulnerability Scoring System (CVSS) score for network system 120. In some cases, risk management system 110 may identify open ports, vulnerable protocols, and/or available exploits in the external facing assets of network system 120.

At 220, risk management system 110 may determine a patching cadence on the network systems. For example, risk management system 110 may identify available patches for various portions of network system 120 that have yet to be installed. Based on the date a given patch was available and/or a date the patchable vulnerability was identified, the system may determine a timing for system updates. For example, if 100 patches are available, but all available patches were from the last week, a patching cadence of one week may be determined. Likewise, if only 10 patches are available, but the patches were available over a month prior, a longer patching cadence may be determined. Furthermore, given two patches with the same severity, the patch available for a longer period longer period of time poses more risk to the organization, as the likelihood of exploitation likewise increases.

At 225, risk management system 110 may discover network system 120 information available on dark-web sources. By discovering on the dark web, risk management system 110 may identify breach source(s), dates of available data, and credentials associated with network system 120. For example, credentials retrieved that include a password are a higher risk to an organization. However, usernames or emails available on the dark web still pose a risk to the organization as numerous tools may be used to crack or brute-force passwords.

At 230, risk management system 110 may analyze historic data breaches of network system 120. In some cases, the historical data breach data may be gathered by surveying the network system 120 (e.g., through questionnaires), however this is merely an example. In some cases, risk management system 110 may analyze breach reports of the network system 120 (e.g., analyzing security breach filings, notices provided for users of the network system 120, or news reports indicative of a cyber incident). In some cases, the historical breach data may be gathered by searching for the availability of credentials for network system 120, for example, on the dark web. The historical data breaches may impact the risk assessment based on, for example, recency, number of breaches, or size of exposure.

At 235, risk management system 110 may perform malware and malicious activity detection on network system 120. In some cases, risk management system 110 may collect data from various data sources (e.g., honeypots, honeynets, blackholes, and blacklists) to identify if any asset of the networked system 120 was linked to or in communication with a known malicious IP address. Additionally, an internal agent may be installed on networked system 120. The internal agent may identify and/or assess host-level vulnerabilities (e.g., vulnerabilities associated with a specific machine on which the internal agent is installed). For example, the internal agent may perform internal scanning to identify various risk factors such as identification of outdated software, identification of insecure ports, and identification of kernel-level issues. The internal agent may perform a malware assessment by viewing and/or generating hashes of files and/or applications stored on network system 120, and compare the hashes to known hash values for known malware. The internal agent may also perform host security benchmark assessments using frameworks such as CIS (Center for Internet Security) Benchmarks, for example, identifying hardening gaps and policies and performing configuration checks on the host system.

At 240, risk management system 110 may perform an environmental risk assessment on network system 120. For example, risk management system 110 may collect data from government resources (e.g., NOAA and USGS) to build historical data on environmental threats. For example, environmental threat assessments may include severe storms, floods, earthquakes, landslides, snow, extreme temperatures, volcanic activity, wildfires, and/or tornados.

At 245, risk management system 110 may assess cloud configuration of network system 120. As will be known by one of ordinary skill, the use of cloud-based resources has greatly increased over time. By analyzing the configuration of cloud environments, risk management system 110 can identify risks that are relevant to server instances, as well as risks that are relevant to the cloud services and how they work in conjunction with each other.

At 250, risk management system 110 may assess risks associated with vendors of network system 120. The impact of vendors on network system 120's score may be based on a risk-threshold for specific vendors. For example, if a vendor's risk is above a given threshold, the network system 120's risk assessment is not affected. However, if the vendor's risk is below a given threshold, the network system 120's risk assessment is reduced, based on additional risks introduced by use of the vendor. In some cases, the use of a secure vendor may improve the network system 120's risk assessment. For example, the use of a verified third-party vendor for high-risk services (e.g., payment processing) may improve the network system 120's risk assessment in comparison to the network system 120 providing this functionality.

At 255, risk management system 110 may perform an insider threat assessment using an internal security information and event management (SIEM) product at network system 120. The SIEM may, for example, monitor a number of failed log-in attempts, determine if the network system 120 is accessed outside of a set boundary or geographic location, detect attempts to bypass corporate security controls, monitor use of new hires and employees who have put in their 2-week notice, or monitor large exports of files or an export of confidential files. The SIEM product may gather data from network system 120 and send the data to risk management system 110.

Finally, at 260, risk management system 110 may perform compliance and control gap assessment. This assessment may include a questionnaire meant to determine if an organization has specific controls in place to safeguard their environment and data, based on the selected framework. The Compliance and control gap assessment may be validated, for example, by a certified auditor or a validation assistant prior to use for impacting scores.

Although several assessments were discussed herein, these are merely an example. In some cases alternative or additional assessment may be implemented. Additionally, in some cases not all assessments may be performed. Furthermore, certain assessments may be performed in different orders, simultaneously, or, and/or asynchronously.

Figure 3:
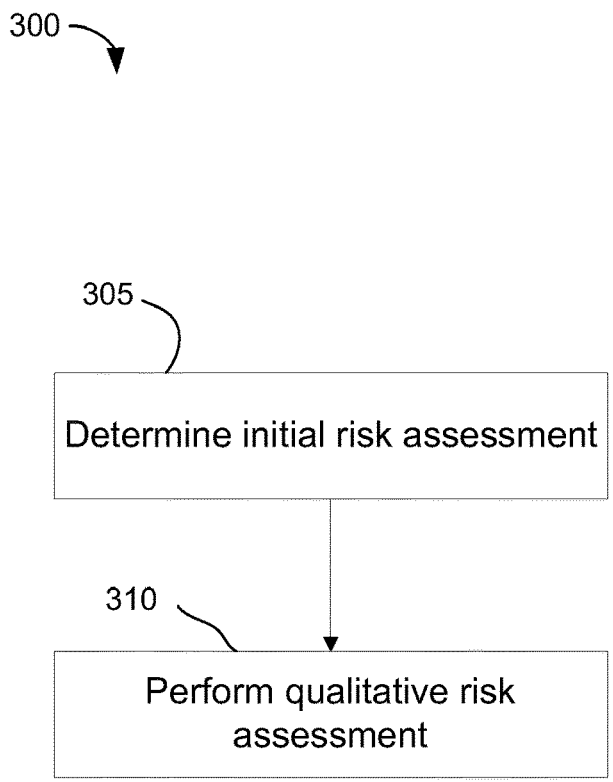
FIG. 3 is a flowchart of level two risk assessment according to aspects of the present disclosure.

FIG. 3 illustrates an example flowchart 300 of performing second level risk assessment. Risk management system 110 may determine 305 an initial risk assessment based on likelihood and impact. For example, Table 1, below illustrates an intersection of impact and likelihood that translates to risk:

TABLE 1

Risk Table

| Likelihood | Impact | | | | |
|---|---|---|---|---|---|
| | Very Low | Low | Moderate | High | Very High |
| Very High | Very Low | Low | Moderate | High | Very High |
| High | Very Low | Low | Moderate | High | Very High |
| Moderate | Very Low | Low | Moderate | Moderate | High |
| Low | Very Low | Low | Low | Low | Moderate |
| Very Low | Very Low | Very Low | Very Low | Low | Low |

The impact analysis may be impacted by types and amount of data potentially exposed. For example, payment information, personally identifiable information, health information, and non-public information may be considered critical, while intellectual property, company emails, and internal confidential data may be considered secret, and marketing material and press releases may be considered low risk. However, this categorization is merely an example, and various changes and customization may be made depending on the circumstance.

In addition to the standard risk analysis, risk management system 110 may perform 310 a qualitative risk calculation. For example, the qualitative risk assessment could assess an impact of a threat (e.g., from 1-10). In some cases, an impact of the threat could be a CVSS score. Additionally or alternatively, severity could be used to determine the impact of the threat.

Additionally, an asset impact can be set. The impact can be a ratio, where 1 is most critical and a non-zero value is least critical. For example, a moderate asset impact can be considered about 0.5, while a low asset impact can be considered about 0.2. Finally, the likelihood of occurrence can be a percentage from 0-100%. In some cases, a default likelihood can be set at 79%. This default value can increase for specific risk factors or decrease for specific protections. For example, insecure ports open on the asset, identification of a known exploit, or an identified active threat (e.g., through the internal assessment) may each increase the likelihood score (e.g., 7% each). In some cases, a user of risk management system 110 may have an ability to alter the likelihood of an event. That is, a GUI implemented by risk management system 110 may provide a user the ability to alter the likelihood of the threat. For example, if controls that are not detectable by risk management system 110 are implemented within network system 120, a true likelihood of occurrence may be less than would be observationally predicted. Once level 2 is complete, qualitative data, including the qualitative risk calculation, may be fed into an customized machine learning structure to create a new custom score. In some cases, the qualitative risk assessment code be calculated using the following formula:

Risk=Impact*(Likelihood*0.01)*Asset Impact.

Figure 4:
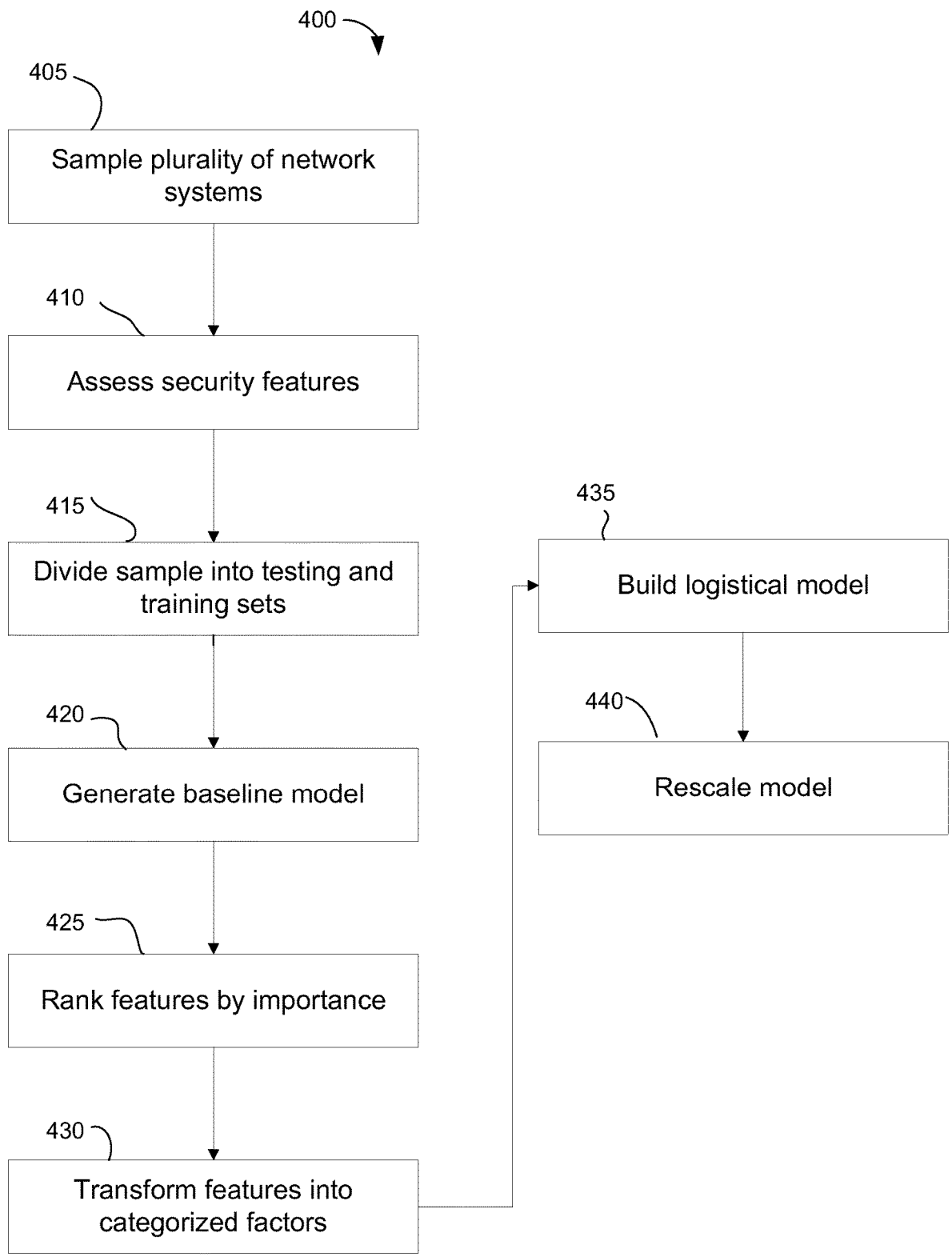
FIG. 4 is a flowchart of creating a logistical analysis model according to aspects of the present disclosure.

FIG. 4 illustrates a model building process 400 for a model utilized by risk management system 110 according to aspects of the present disclosure. First, a plurality of network systems 120 of different organizations are sampled 405. The companies may be of different sizes and in different industries. Next, all the security features of the various network systems 120 are assessed 410. In some cases, the assessment may be presented to an advisory committee to rate a likelihood to be breached on a scale of 1 to 10. The security features are positioned as the predictor and the likelihood to be breached as the target. The likelihood to be breached is binarized by transforming likelihood of breach that are rated 7 and above to a "bad" outcome and otherwise to a "good" outcome.

Next, the sample is split 415 into a training set and a testing set. The splitting 415 may be done by using simple random sampling of the sample. The training set may be used to build a model while the testing data set may be used to validate the model. The training set may include roughly 70% of the sample. Next, standard machine-learning approaches can be used to generate 420 a rough model for baseline comparison. For example, Extreme Gradient Boosting (XGBoost) may be used to generate a baseline model.

One or more classification models can be used to rank 425 most important features to accurately capture the security risk of a company. The features may be ranked using a statistical measurement called "importance" and the features that consistently rise to the top across different models were selected for the logistic model. As non-limiting examples, random forest, deep learning (AI), and decision trees may be used to classify the features.

Once the features are selected, they may be transformed 430 into categorized factors by binning the features, e.g., optimally, for example using a statistical concept called Weight of Evidence (WoE). By binning the features, groups within the features cam classify the target outcome in a monotonic fashion.

Next, the logistic model may be built 435. For example, logistic regression may be used to blend the transformed (binned) version of the relevant features as a predictor for the likelihood of breach. The performance of the model can be tested and validated, for example, using Kolmogorov-Smirnov (KS) test and area under the ROC curve.

Finally, the logistics model can be scaled 440 to move the model from a multiplicative model to an additive model for deployment convenience. The model provides a balance of sophistication and simplicity. In some cases, this is achieved by employing advanced machine learning techniques in the early stages of the process and a traditional logistic model in the final stages of the process. This approach enables extracting the predictive power of cutting-edge machine learning tools without compromising the explainability of simple logistic regression.

Accordingly, aspects of the present disclosure can provide a number of features and structural differences from the related art. For example, the use of advanced machine learning techniques in the score development process preplaces blunter approaches taken by the prior ar. Furthermore, utilizing a holistic set of data sources provides a better view of true security risks of a network system 120. Furthermore, the system may provide automated reason codes to clarify why a network system 120 receives a particular score. That is, unlike in the related art, the use of simple logistic regression in the later stages enables the construction of automated frameworks that explains the reasons for score variations.

Finally, as discussed previously, the risk assessment model enables real-time configurability and personalization (customization) of cyber risk score to fit specific risk assessment needs. In some cases risk assessment system may provide a GUI for adjusting the level of influence of individual cyber security risk categories in order to create a custom score that is assessed, updated, and displayed (e.g., along with the standard score). Using the GUI, clients can assign and modify weights attached to each cyber security risk category when calculating the custom scores, in order to increase or decrease the relative impact of individual cyber security risks compared to the final risk assessment. In some cases, the GUI may provide for removing entire cyber security risk categories form the risk assessment. In certain cases, the GUI may demonstrate a percentage of the risk score is attributed to each risk factor. The GUI may provide an ability to modify the percentage for each risk factor to provide intuitive interface for risk factor adjustment.

The personalization of the cyber risk score may be implemented through a "custom risk modeling" module. The custom-risk module may allow a user to create a custom score(s) themselves or third-parties (e.g., vendors or connected systems). Creating a custom score for third-parties allows modeling of a risk assessment based on the relationship or services rendered.

In some instances, the GUI may provide for customization of weighting of various risk factors. For example, custom weights may be applied to historical data breaches, application risk, internal network risk, third-party risk (e.g., risk associated with vendors), external network risk, dark web discoveries, critical issues, security controls, patching cadence, and/or malware presence. The GUI may provide a list of risk factors with respective sliders to select a customized weighting values. In some cases, the sliders may be able to select a value, for example, between 0 and 100%. In certain implementations the GUI may require a total weight of the risk factors must equal 100%. However, this is merely an example. In some cases the weight value may be normalized (e.g., to 100%. In some cases, the sliders may select a value from 0 to 300% or more. A default value of 100% may be applied, and custom adjustments to the weights may be made. In some cases, a risk score range (e.g., maximum score) may be increased as the custom weight values change. For example, a customized weight factor for malware presence may be double a default weight factor. and the remaining weight factors may be kept at default. Accordingly, a maximum risk score would increase based on a higher potential risk value attributable to malware presence. One of ordinary skill will recognize that these are merely examples, and the GUI may provide for customization of weight factors in a multitude of ways.

Furthermore, in some cases, in addition to an overall assessment, the system may provide asset group scores (e.g., by dividing assets into groups). For example, a university may divide assets based on department, and seek an assessment for each department's assets. Likewise, there may be provided "in-scope" scores for specific third parties. This enables narrow and/or tailored scopes of what is included in specific assessment in order to provide a better understanding of how groups or third-parties affect risk exposure. These technical features provide improvement over the broad-based approaches described in certain related art.

In some cases, while in the process of creating a score, the GUI may present a number of issues per risk factor associated with the relevant network system 120. As the weighting is adjusted, the application calculates the modified score in real-time. This provides second-level training illustrating how the adjusted weights will impact the current score for the most recent assessment, providing new, technical features to the client. Once a customized scoring paradigm is established, previous assessments may be recalculated using the new weight. As time goes on, this custom score calculation can be updated based on changing needs relative to the dynamic landscape of cyber security risk.

In addition, the GUI may enable custom scoring for third party vendors either related or potentially related to the network system 120. If desired, each third party within a portfolio can have a different risk model applied. This allows creation risk models that fit the exact relationship and services provided by a third party to better determine and illustrate how the third party risk affects their internal risk exposure.

As discussed preciously, part of the data gathering process in level none may include one or more questionnaires prepared by a user (e.g., administrator) of network system 120. In order to improve the fidelity of the questionnaires and identify any unknown errors or contradictions, in some cases, risk management system 110 may provide a validation assistant. After each assessment completes, the validation assistant passes through the findings and maps the assessment results to specific controls in each of the in-scope questionnaires. These findings are displayed with the questionnaires for both self-assessment and third party evaluation. A GUI may be provided to enable drilling into the findings for more details and even travel to the related part of the platform (e.g., moving to the appropriate area of the application to view the data).

In some cases, the validation assistant can evaluate various types of "Not in Place" Findings. For example, network vulnerabilities, application vulnerabilities, patching cadence, open ports, asset details, threat events, dark web exposure, environmental threats, active threats, and third-party data breach maps may all be evaluated. Table 2, below outlines the different types of findings potentially evaluated and linked.

TABLE 2

| Vulnerability Type | Mappings |
| --- | --- |
| Network Vulnerabilities | Risk Level-directly maps to any control requirement that mandates vulnerability severities above a certain threshold be remediated (e.g. any high or critical risk network vulnerabilities flagged for HiTRUST requirement 09.m Network Controls) Specific Issues-directly maps to network specific findings that contradict the effectiveness of network layer countermeasures (e.g. any weak cipher vulnerabilities flagged for cryptography related requirements) |

TABLE 2-continued

| Vulnerability Type | Mappings |
| --- | --- |
| Application Vulnerabilities | Risk Level-directly maps to any control requirement that mandates application vulnerability severities above a certain threshold be remediated (e.g. any high or critical risk application vulnerabilities flagged for PCI 3.2.1 requirement 6.5.6 Does your organization ensure that coding techniques address any "high risk" vulnerabilities that could affect the application, as identified in PCI DSS Requirement 6.1?)<br>Specific Issues-directly maps to network specific findings that contradict the effectiveness of network layer countermeasures (e.g. any XSS vulnerabilities flagged for PCI 3.2.1 requirement 6.5.7 Does your organization ensure that cross-site scripting (XSS) is addressed by coding techniques that include validating all parameters before inclusion and utilizing context-sensitive escaping?) |
| Patching Cadence | Maps any unpatched software discoveries that have exceeded standard patching cadence guidelines to framework requirements (e.g. any unpatched software discovered flagged for PCI 3.2.1 requirement 6.2 Does your organization ensure that all system components and software are protected from known vulnerabilities by installing applicable vendor-supplied security patches and install critical security patches within one month of release?) |
| Open Ports | Any Insecure-maps any open ports discovered and known to be insecure to control requirements (e.g. any open ports discovered flagged for PCI 3.2.1 requirement 1.1 Has your organization established and implemented firewall and router configuration standards?)<br>Open database ports-maps any open database ports discovered to any control requirement that mandates restricting access to system components (e.g. any open database ports discovered are flagged for PCI 3.2.1 requirement 1.2 Does your organization build firewall and router configurations that restrict connections between untrusted networks and any system components in the cardholder data environment?)<br>Open, insecure remote access ports-if any of ports 21, 23, 3389 are found to be open it maps to any control requirement that require encrypted access to systems (e.g. any open, insecure remote access ports discovered will be flagged for PCI 3.2.1 requirement 2.3 Does your organization encrypt all non-console administrative access using strong cryptography?)<br>Open, insecure communications ports-if ports 21 or 80 are found to be open they'll map to any control requirement that require sensitive communications to be encrypted (e.g. any open, insecure communication ports discovered will be flagged for PCI 3.2.1 requirement 6.5.4 Does your organization ensure that insecure communications are addressed by coding techniques that properly authenticate and encrypt all sensitive communications?) |
| Asset Details | Multiple types defined for an asset-any assets that have more than one type assigned to them will map to any framework requirements specify only one function per server (e.g. any asset found to have more than one type specified will be flagged for PCI 3.2.1 requirement 2.2.1 Does your organization implement only one primary function per server to prevent functions that require different security levels from co-existing on the same server?) |
| Threat Events | Maps to specific threat events that contradict effectiveness of countermeasures mandated by a framework requirement, (e.g. any Clickjacking Attack threats discovered will be flagged for ISO 27001 control Information involved in online transactions is protected to prevent incomplete transmission, mis-routing, unauthorized message alteration, unauthorized disclosure, unauthorized message duplication or replay) |
| Dark Web | Exposed passwords-any dark web findings that include passwords map to any control requirements related to password management (e.g. any exposed passwords discovered will be flagged for HiTRUST control 01.r Password Management System)<br>Exposed Administrators-any dark web findings of root or administrator accounts for the company domain map to framework requirements surrounding usage of root or administrator accounts (e.g. any exposed root or administrator accounts will be flagged for ISO 27001 control.) |
| Environmental | Maps to any environmental findings that contradict the effectiveness of control mandated environmental countermeasures (e.g. any environmental threat finding will be flagged for HiTRUST control 08.d Protecting Against External and Environmental Threats) |
| Active Threat | Maps to any threat intelligence findings that contradict the effectiveness of countermeasures against malicious software mandated by a framework requirement. (e.g. any threat intelligence finding will be flagged for HiTRUST control 09.j Controls Against Malicious Code) |
| Third-Party | Data breach-any finding of a third party with a data breach maps to framework requirements surrounding third party data breach disclosure (e.g. any third party found to have a data breach will be flagged for HiTRUST control 13.c Accounting of Disclosures) |

TABLE 2-continued

| Vulnerability Type | Mappings |
|---|---|
| In Place Findings | In use-maps to certain control requirements relating to identifying security issues (e.g. having an assessment on the platform will be flagged for HiTRUST control 03.a Risk Management Program Development) Continuously monitored-using the risk management system 110 to run weekly or monthly assessments map to requirements to continuously monitor for security issues (e.g. being assessed regularly will be flagged for HiTRUST control 03.d Risk Evaluation) Internal assessments-using the internal assessment functionality of the risk management system 110 maps to control requirements that mandate identifying vulnerabilities on internal systems (e.g. any internal agents present will be flagged for PCI 3.2.1 requirement 11.2.1 Perform quarterly internal vulnerability scans. Address vulnerabilities and perform rescans to verify all "high risk" vulnerabilities are resolved in accordance with the entity's vulnerability ranking (per Requirement 6.1). Scans must be performed by qualified personnel.) Third Party Module-using the risk management system 110's third party module maps to control requirements involving third party relationships (e.g. any third party monitored on the platform will be flagged for ISO 27001 requirement Services, reports and records provided by third party are regularly monitored and reviewed.) |

To further create time savings, the validation assistant capabilities may include administrative control review. In the context of cyber security, administrative controls primary focus on policies and procedures. Through a Natural Language Processing (NLP) AI-based model the validation assistant can facilitate reviewing policies and procedures to ensure alignment with the assigned framework. By analyzing all provided policies, validation assistant can virtually eliminate searching for specific sections or paragraphs relevant to the control at hand. In some cases, to make full use of the feature, necessary policy, procedure or standard documents must be provided to the validation assistant. However, this is merely an example and, in some cases, validation assistant can proactively identify. From there, NLP tools are used to read the policy documents and returns an answer to the control. If the policy conflicts with the user provided answer, the platform flags the question for having contradictory supporting evidence.

Example Computing System Architecture

Figure 5:
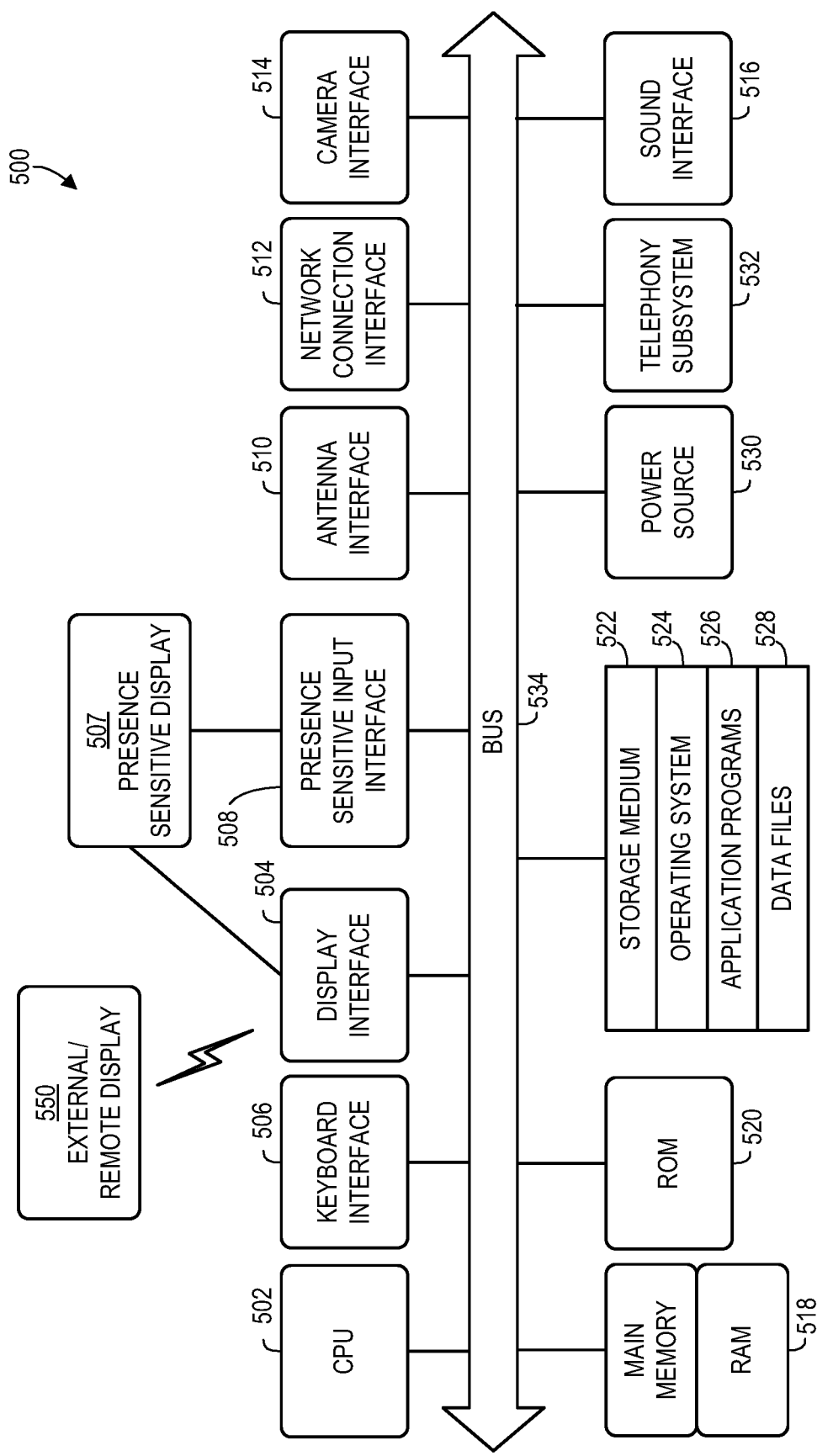
FIG. 5 is a block diagram of an illustrative computer system architecture according to an example embodiment.

FIG. 5 is a block diagram of an illustrative computer system architecture 500, according to an example implementation. As non-limiting examples, risk management system 110, network system 120, and external computing device 130 may be implemented using one or more elements from the computer system architecture 500. It will be understood that the computing device architecture 500 is provided for example purposes only and does not limit the scope of the various implementations of the present disclosed systems, methods, and computer-readable mediums.

The computing device architecture 500 of FIG. 5 includes a central processing unit (CPU) 502, where computer instructions are processed, and a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display 550 that is not necessarily physically connected to the mobile computing device. For example, a desktop monitor may be used for mirroring graphics and other information that is presented on a mobile computing device. In certain example implementations, the display interface 504 may wirelessly communicate, for example, via a Wi-Fi channel or other available network connection interface 512 to the external/remote display 550.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display 550 that is not necessarily connected to the mobile computing device. In one example, a desktop monitor may be used for mirroring or extending graphical information that may be presented on a mobile device. In another example, the display interface 504 may wirelessly communicate, for example, via the network connection interface 512 such as a Wi-Fi transceiver to the external/remote display 550.

The computing device architecture 500 may include a keyboard interface 506 that provides a communication interface to a keyboard. In one example implementation, the computing device architecture 500 may include a presence-sensitive display interface 508 for connecting to a presence-sensitive display 507. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence sensitive display interface 508, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device architecture 500 includes a power source 530 that provides an appropriate alternating current (AC) or direct current (DC) to power components.

According to an example implementation, the computing device architecture 500 includes a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers.

More specifically, the CPU 502 loads computer-executable process steps from the storage medium 522 or other media into a field of the RAM 518 to execute software programs. Data may be stored in the RAM 518, where the data may be accessed by the computer CPU 502 during execution.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may include a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

An embodiment of the present disclosure may be implemented according to at least the following:

Clause 1: A method of building a risk management model, the method including: sampling a plurality of organization networks; assessing identified security features; ranking the identified security features based on security risk; transforming ranked features into categorized factors; building logistic model to blend the categorized factors into a likelihood of breach; and transforming the logistics model from a multiplicative model to an additive model by scaling the logistics model.

Clause 2: The method of claim 1 further comprising binning the security features based on a likelihood of breach prior to transforming the features into categorized features.

Clause 3: The method of Clause 1 or Clause 2 further comprising dividing the sampled organization networks into a sample set and a training set, the training set representing about 70% of the sampled networks.

Clause 4: The method of any of Clauses 1-3, wherein ranking the identified security features based on security risk includes: assessing the plurality of features using a plurality of logistical models; and ranking the features based on impact identified from the plurality of logistical models.

Clause 5: The method of claim 4, wherein the plurality of logistical models comprises at least two from among random forest, deep learning (AI), and decision trees.

Clause 6: The method of any of Clauses 1-5, wherein transforming the ranked features into categorized factors utilizes weight of evidence.

Clause 7: The method of any of Clauses 1-6, wherein building the logistics model comprises applying logistic regression to blend the transformed features as a predictor for the likelihood of breach.

Clause 8: A method of performing risk management of networked systems, the method including: performing at least one of external network assessments and external web application assessments; determining a patching cadence on the networked systems; analyzing historic data breaches of the networked systems; performing an environmental risk assessment on networked systems; assessing risks associated with vendors of networked systems; and performing compliance and control gap assessment.

Clause 9: The method of Clause 8 further comprising the method of any of Clauses 1-7.

Clause 10: The method of Clause 8 or Clause 9 further comprising: harvesting domain records based on one or more root domains of the networked systems; identifying externally facing assets of the networked systems; and gathering geolocation and open port information of the networked systems.

Clause 11: The method of any of Clauses 8-10, wherein the external network assessment comprises identifying potential vulnerabilities at a network layer of the networked systems.

Clause 12: The method of any of Clauses 8-11, wherein the application assessment comprises identifying potential vulnerabilities at an application layer of the networked systems.

Clause 13: The method of any of Clauses 8-12, wherein determining a patching cadence comprises: identifying available patches for various portions of networked systems that have yet to be installed; and determining the patching cadence based on either a date a given patch was available or a date a patchable vulnerability was identified.

Clause 14: The method of any of Clauses 8-13 further comprising discovering networked-systems data on dark-web sources to identify one or more of breach sources, dates of available data, and credentials associated with the networked systems.

Clause 15: The method of any of Clauses 8-14 further comprising detecting malware and malicious activity on the networked system.

Clause 16: The method of claim 15, wherein detecting malware and malicious activity comprises: installing an internal agent on the networked systems; and performing, with the internal agent, a malware assessment by generating hashes of files stored on the networked and comparing the hashes to known hash values for known malware.

Clause 17: The method of any of Clauses 8-16, wherein performing an environmental risk assessment on networked systems comprises collecting data from government resources to build historical data on environmental threats.

Clause 18: The method of any of Clauses 8-17 further comprising assessing a cloud configuration of the networked systems.

Clause 19: The method of any of Clauses 8-18 further comprising performing an insider threat assessment using internal security information and event management of the networked systems.

Clause 20: The method of any of Clauses 8-19 further comprising performing a second-level risk assessment.

Clause 21: The method of Clause 20, wherein the second-level risk assessment comprises: determining an initial risk assessment based on risk likelihood and impact; and performing a qualitative risk assessment to determine an impact of a threat.

Clause 22: A system comprising at least one processor and at least one memory having stored thereon instructions that, when executed by the at least one processor, control the at least one processor to perform any of the method of Clauses 1-21.

Clause 23: A non-transitory computer readable medium having stored thereon instructions that, when executed by at least one processor, control the at least one processor to perform any of the method of Clauses 1-21.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of building a risk management model, the method comprising:
    sampling, via a computer network connection interface, a plurality of organization networks;
    assessing identified security features;
    ranking the identified security features based on security risk, wherein ranking the identified security features comprises:
        assessing the plurality of features using a plurality of logistical models; and
        ranking the features based on impact identified from the plurality of logistical models;
    transforming ranked features into categorized factors;
    building a logistic model to blend the categorized factors into a likelihood of breach;

transforming the logistics model from a multiplicative model to an additive model by scaling the logistics model;

assessing an impact of a threat using the additive model; and controlling, via the computer network connection interface and based on the threat, one or more online transactions.

2. The method of claim 1 further comprising binning the security features based on a likelihood of breach prior to transforming the features into categorized features.

3. The method of claim 1 further comprising dividing the sampled organization networks into a sample set and a training set, the training set representing at least 70% of the sampled networks.

4. The method of claim 1, wherein the plurality of logistical models comprises at least two from among random forest, deep learning (AI), and decision trees.

5. The method of claim 1, wherein transforming the ranked features into categorized factors utilizes weight of evidence.

6. The method of claim 1, wherein building the logistics model comprises applying logistic regression to blend the transformed features as a predictor for the likelihood of breach.

7. The method of claim 1, wherein controlling the one or more online transactions comprises preventing an incomplete transmission.

8. The method of claim 1, wherein controlling the one or more online transactions comprises preventing a mis-routed message.

9. The method of claim 1, wherein controlling the one or more online transactions comprises preventing an unauthorized message alteration.

10. The method of claim 1, wherein controlling the one or more online transactions comprises preventing an unauthorized disclosure.

11. The method of claim 1, wherein controlling the one or more online transactions comprises preventing unauthorized message duplication or replay.

* * * * *